United States Patent [19]

Mayr

[11] Patent Number: 5,785,624

[45] Date of Patent: Jul. 28, 1998

[54] DIFFERENTIAL DRIVE WITH SUPPORTING MEANS FOR DIFFERENTIAL GEARS

[76] Inventor: Nikolaus Mayr, Reischacherstrasse 2a, I-39031 Reischach/Bruneck, Italy

[21] Appl. No.: 634,819

[22] Filed: Apr. 19, 1996

[30] Foreign Application Priority Data

Jul. 21, 1995 [IT] Italy .................. MI95A1584

[51] Int. Cl.$^6$ .................................. F16H 48/06
[52] U.S. Cl. ..................... 475/252; 475/331; 475/248
[58] Field of Search ..................... 475/331, 335, 475/346, 252, 248, 344

[56] References Cited

U.S. PATENT DOCUMENTS

| | | | |
|---|---|---|---|
| 3,375,735 | 4/1968 | Saari | 475/252 X |
| 5,122,101 | 6/1992 | Tseng | 475/249 X |
| 5,194,058 | 3/1993 | Amborn et al. | 475/344 |
| 5,366,422 | 11/1994 | Dye et al. | 475/252 X |
| 5,554,081 | 9/1996 | Bowerman | 475/252 |
| 5,599,250 | 2/1997 | Nakajima et al. | 475/248 X |
| 5,632,704 | 5/1997 | Yamazaki et al. | 475/248 |

FOREIGN PATENT DOCUMENTS

| | | |
|---|---|---|
| 347165 | 12/1989 | European Pat. Off. . |
| 639730 | 2/1995 | European Pat. Off. . |

*Primary Examiner*—Khoi Q. Ta
*Assistant Examiner*—Peter T. Kwon
*Attorney, Agent, or Firm*—Dinnin & Dunn, P.C.

[57] ABSTRACT

A different drive with a differential carrier rotatably supported in a differential housing. The differential drive includes a carrier portion and two cover parts. Two axle shaft gears are coaxially rotatably supported in the differential carrier. The differential drive further includes two sets of differential gears which are slidingly received in axis parallel recesses in a carrier portion. The differential gears are axially supported on the cover parts by spacing journals. The spacing journals ends are provided with supporting discs.

14 Claims, 9 Drawing Sheets

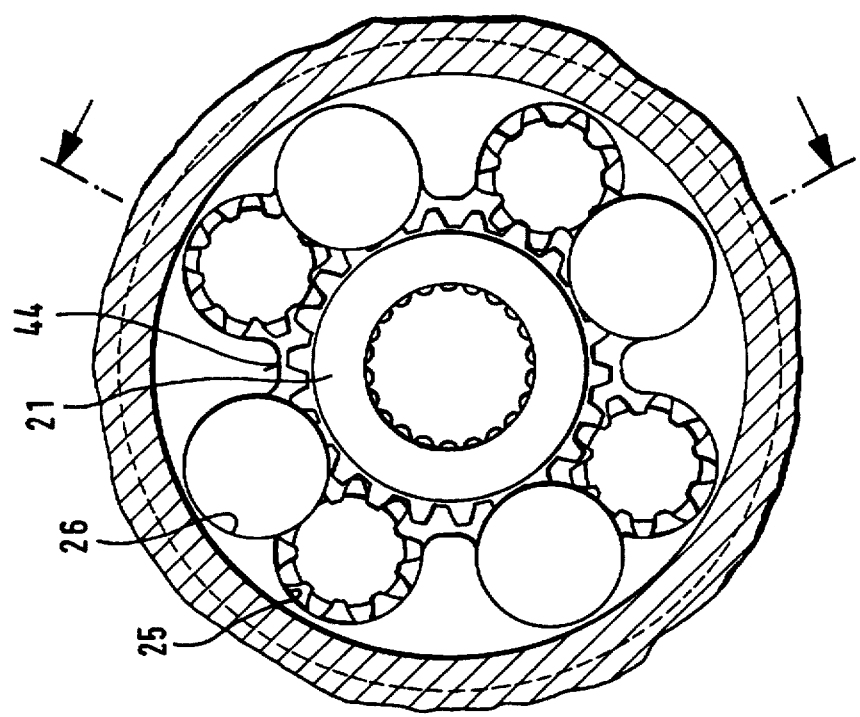
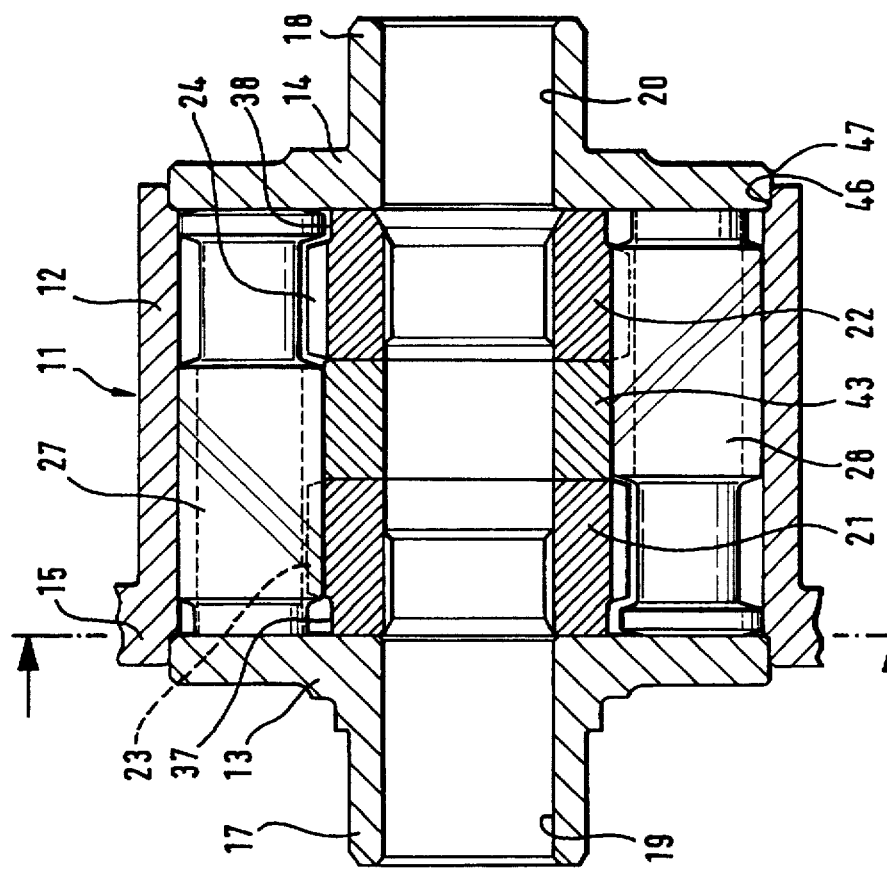
Fig. 1a
Fig. 1b

DIFFERENTIAL DRIVE WITH SUPPORTING MEANS FOR DIFFERENTIAL GEARS

BACKGROUND OF THE INVENTION

The invention relates to a differential drive with a differential carrier rotatably drivably supported in a differential housing, consisting of a carrier portion and two cover plates closing same at both ends, with two axle shaft gears which are coaxially rotatably supported in the differential carrier, which are received in coaxial bores in the carrier portion and are each connectable to an axle shaft, and with two sets of differential gears which, on their tooth heads, are slidingly received in axis-parallel recesses in the carrier portion, which recesses intersect each other and the bores, with the teeth of the differential gears of each of the two sets engaging the teeth of one of the axle shaft gears and of at least one differential gear of the other set, with the axis-parallel recesses being designed to be axially continuous in the carrier portion and with the differential gears comprising toothed regions and spacing journals adjoining the latter, with the differential gears being supported on the cover parts by means of the spacing journals.

Differential drives of said type are known from DE 40 13 200 A1 for example. To simplify the production of the differential carrier, the carrier portion, in this case, is provided with continuous constant diameter bores and recesses which, in the course of production, can easily be broached. For axially fixing the differential gears in said continuous recesses it is proposed that the differential gears are extended beyond their toothed regions by spacing journals and approximately correspond to the length of the carrier portion. At the ends of the recesses, the differential gears are axially supported on stop or closing means which are usually formed by cover parts closing the carrier portion at its ends. However, it is also possible to provide simply designed stop discs or securing rings directly inserted into the recesses.

DE 40 17 800 A1 describes differential drives of a similar type wherein the differential gears only occupy part of the length of the carrier portion, which partial length corresponds to the length of engagement with the teeth of one of the axle shaft gears plus the length of engagement with the teeth of another one of the differential gears. The differential gears are received in blind holes in the differential carrier, which are circumferentially distributed so as to start alternately from both axial ends of the carrier portion. The blind holes are directly closed by stop discs clamped in between the covers and the carrier portion.

A characteristic feature of differential drives of said type consists in that the differential gears are supported directly in the recesses on their tooth heads, which type of support— due to the reaction forces between the axle shaft gears and the differential gears and between the differential gears of the different sets—generates a great deal of friction at the tooth heads and thus a torque—dependent slip-limiting effect. As the teeth of the differential gears of the two sets engage one another only along part of their axial length which adjoins the respective length of engagement with one of the two axle shaft gears, the load conditions along the length of the differential gears vary. Because the coaxial bores for the axle shaft gears and the axis-parallel recesses for the differential gears intersect one another radially, the latter are inadequately supported in the differential carrier against radially inwardly pointing reaction forces outside their region of engagement with the respective axle shaft gear.

It is the object of the present invention to improve the contact and load conditions of the differential gears in their recesses. The objective is achieved in that the differential gears, at one end of the toothed regions, comprise spacing journals whose ends are provided with supporting discs whose greatest diameter corresponds to the major diameter of the toothed regions and that the differential gears, at the other end of the toothed regions, comprise second spacing journals whose length approximately corresponds to that of the supporting discs, with the supporting discs being slidingly supported inside the recesses in the carrier portion.

With the differential gears being designed in accordance with the invention, they are effectively supported along their entire axial length against radially inwardly pointing reaction forces. This is ensured by the supporting discs being slidingly supported in a bearing-like way inside the recesses in the carrier portion. The eccentricity of the recesses and the circumferential distance between adjoining recesses intersecting one another have to be selected to be such that, relative to the supporting discs, the recesses comprise an angle U of grip of α greater than 180°, unless there are provided additional supporting means which will be described later. The design of the carrier portion remains unchanged as compared to the initially described state of the art, i.e. the possibility of producing the bores and recesses by the cost-effective method of broaching continues to exist. The effective radial support provided for the differential gears at their two axial ends prevents the differential gears from becoming axially misaligned; it also prevents uneven tooth wear and a non-uniform contact of the tooth heads in the recesses, which would reduce the slip-limiting effect.

The second spacing journals at the differential gears whose diameter is reduced relative to the toothed portion of the differential gears provide the geometric conditions for designing the supporting discs at the ends of the first spacing journals of the associated differential gears. As the differential gears which engage one another in the case of differential movements in the drive rotate so as to be in rolling contact with one another, it is preferable for the supporting discs and second spacing journals of differential gears directly engaging one another to be positioned in a contact-free way relative to one another because, due to the different diameters, they also feature different circumferential speeds. However, if the surface quality permits a sliding contact, it is also possible to allow a mutual contact between the supporting discs and second spacing journals, which results in supplementary support for the supporting discs and an increase in the size of the friction faces generating the slip-limiting effect. If the differential gears directly engaging one another are of identical design, they are arranged in opposite axial orientations relative to one another.

In addition to the direct support provided for the supporting discs within the recesses, which is provided in any case, it is possible, especially with small angles of grip of the supporting discs, through the recesses, to provide means for additionally supporting the supporting discs radially inwardly, which means will be listed in detail below.

According to a first preferred embodiment it is proposed that at least at one, but preferably at both cover ends, the axle shaft gears each comprise untoothed cylindrical projections extending axially towards the cover parts and that the cover part faces pointing towards the carrier portion are planar. In this way, by designing the cover parts in the simplest possible way, it is possible to create the geometric conditions for introducing the supporting discs into the recesses in the carrier portion, with the axle shaft gears directly contacting the cover parts.

In a further embodiment, the supporting discs are additionally radially inwardly supported on the cylindrical projections of the axle shaft gears. In this way, when the tooth forces are high and the angle of grip U of the supporting discs is small, it is possible, in the recesses, to avoid a clamping effect and improve the supporting conditions.

Said further additional supporting means, too, meet the objective of axially fixing the axle shaft gears and of creating a free space for the supporting discs and of additionally supporting the supporting discs radially inwardly. They are preferably used to achieve both objectives, i.e. they are used as axial fixing means and radial supporting means.

In a second preferred embodiment, it is proposed that at least at one, but preferably at both cover ends, the cover parts each comprise central projecting cylindrical collars which extend axially towards the carrier portion, which extend into the bores and on which the supporting discs are additionally supported radially inwardly. The basic shape and mode of operation of said cylindrical collars corresponds to that of the above-mentioned cylindrical projections at the axle shaft gears; but instead of co-rotating by being connected to the axle shaft gears, they are fixed by being connected to the cover parts. The axial length of the axle shaft gears is shortened accordingly, and in this case, too, there exists a direct axial contact between the axle shaft gear and the cover part. The cover part continues to be shown as a simple rotational member.

In a further embodiment of the above, the circumference of the cylindrical collar is provided with inner cylindrical troughs which are supportingly engaged by the supporting discs. In a preferred way, the line contact between the supporting disc and cylindrical collar is thus replaced by a surface contact, thereby reducing the wear values.

According to a further preferred embodiment it is proposed that at least at one, but preferably at two cover ends, separate central cylindrical annular members are inserted between the cover parts and the carrier portion, which annular members extend into the bores, and that the supporting discs are additionally radially inwardly supported on the annular members. Again, while the function is the same as described above, the basic shape and arrangement of the annular members are the same as those of the above-mentioned cylindrical projections whose space is now occupied by the separate annular parts. In this embodiment, it is easier to produce the planar inner faces of the cover parts and the projection-less axle shaft gears which rest against the annular members. The annular members are self-centering between the circumferentially distributed supporting discs and may roll thereon.

According to a preferred modification of the above, the circumference of the separate annular members may be provided with inner cylindrical troughs which are supportingly engaged by the supporting discs. Whereas previously, the rotational position of the separate annular members was in different, this embodiment permits a defined circumferential position. The annular members may be increased in size to such an extent that they are no longer held and centered by the supporting discs but by the bores for the axle shaft gears. The form-fitting connection with the supporting discs prevents any rotation.

To the extent that a restriction was mentioned above in that said additional supporting means should be provided at least at one axial cover end, but preferably at both axial cover ends, this should be interpreted in such a way that in principle, because of the identical shape of the axle shaft gears, all axle shaft gears comprise supporting discs at their first spacing journals, with support being provided in any case due to the circumscribing effect of the recesses, but that if additional radial supporting means are provided, these should be provided at both cover ends, but it is possible to combine different shapes, for example a cylindrical collar at one cover part and a cylindrical projection at the opposed axle shaft gear. As a rule, however, a symmetrical design is preferred.

According to a further preferred embodiment, it is proposed that the carrier portion comprises substantially planar end faces and that the cover parts, at least outside a diameter defined by the bores, comprise planar inner faces which rest against the end faces of the carrier portion. In this case, it is particularly advantageous if the carrier portion and the cover parts, at their outer circumferences, comprise centering means which cooperate with one another, i.e. especially a first component provided with a cylindrical centering edge, preferably the cover part which, in a centered way, engages the inner centering collar at the other component, preferably the carrier portion.

The preferred embodiment of the supporting discs comprises a smooth cylindrical outer surface which is preferable, especially as regards the line contact with the cylindrical projection or cylindrical collar. For reasons of production and for lubricating purposes, the supporting discs, too, may be provided with teeth or a toothed run-out region of the same type as the toothed portions. The teeth may be straight or inclined/helical.

According to an advantageous further embodiment, the toothed regions of the differential gears and/or of the axle shaft gears, at their axial ends, may extend in a curved way towards their respective axis in order to avoid any edge load bearing during the engagement of teeth if the differential gears are subject to resilient bending under torque load.

BRIEF DESCRIPTION OF THE DRAWINGS

Preferred embodiments of the invention will be described below with reference to the drawings wherein:

FIG. 1a is a longitudinal section (along the sectional line shown in FIG. 1b) through a differential carrier of a differential drive in accordance with the invention, having axle shaft gears and differential gears.

FIG. 1b is a cross-section (along the sectional line of FIG. 1a) through the differential carrier of a differential drive in accordance with the invention, as shown in FIG. 1a.

(a) in a partial longitudinal section (b) in a perspective illustration in the form of an exploded view.

Figure 6A:
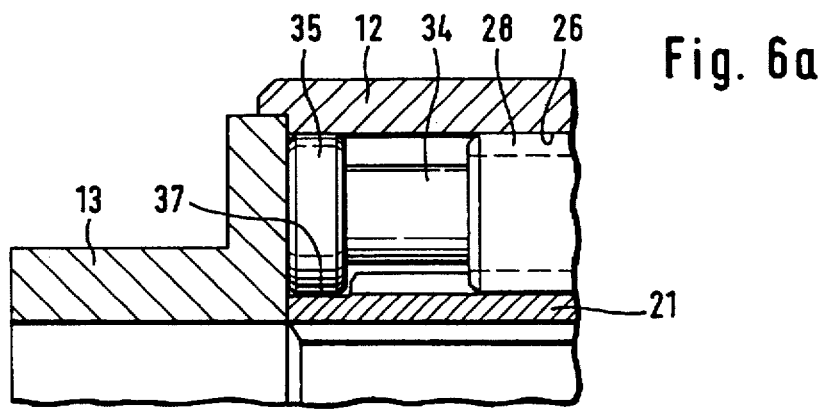
Figure 6B:
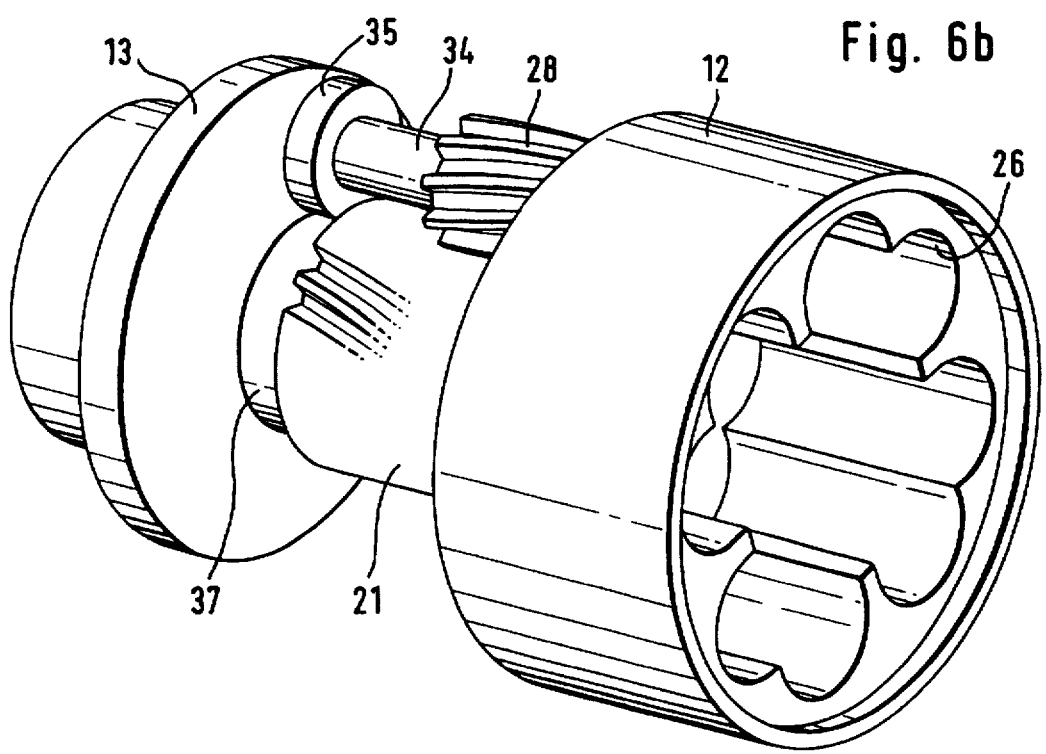

FIG. 6 shows the general configuration of the carrier portion, cover part and supporting roller with additional supporting means for the supporting rollers in a first embodiment;

(a) in a partial longitudinal section (b) in a perspective illustration in the form of an exploded view.

Figure 7A:
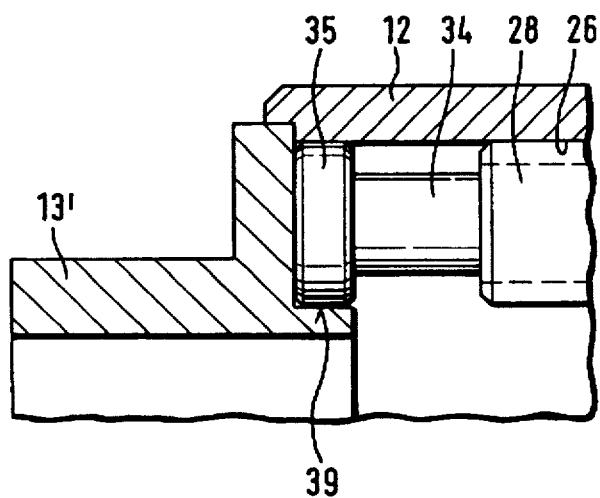
Figure 7B:
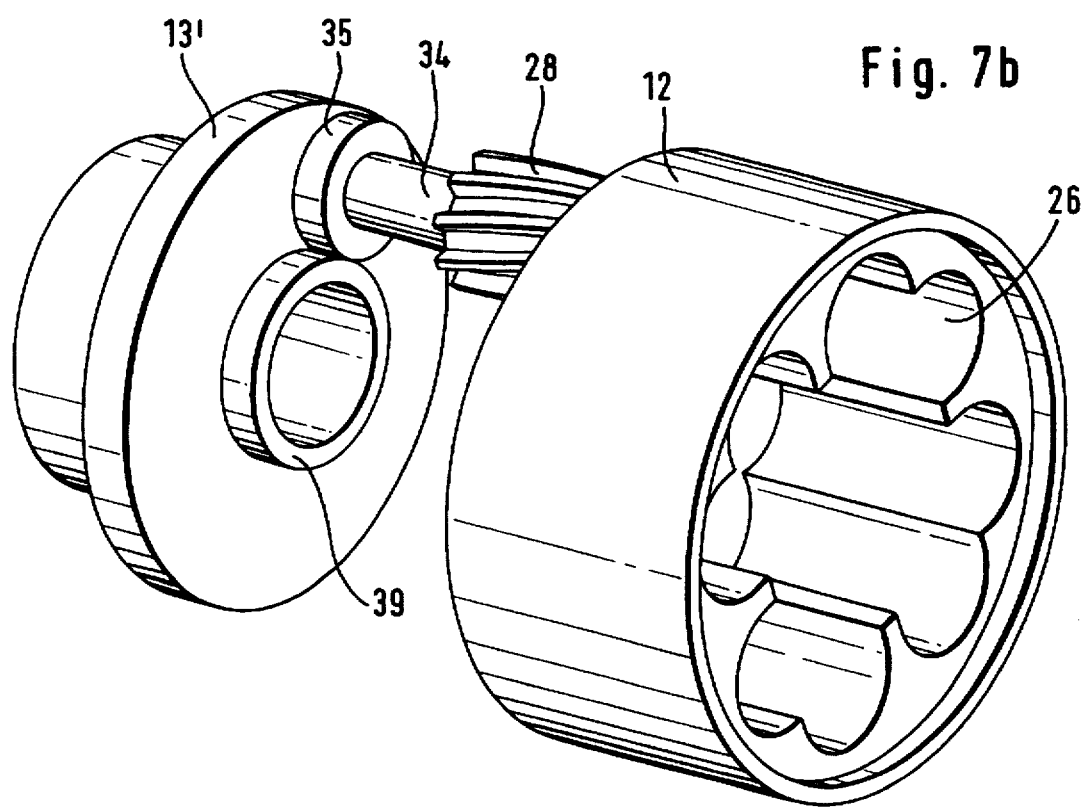

FIG. 7 shows the general configuration of the carrier portion, cover part and supporting roller with additional supporting means for the supporting rollers in a second embodiment;

(a) in a partial longitudinal section (b) in a perspective illustration in the form of an exploded view.

Figure 8A:
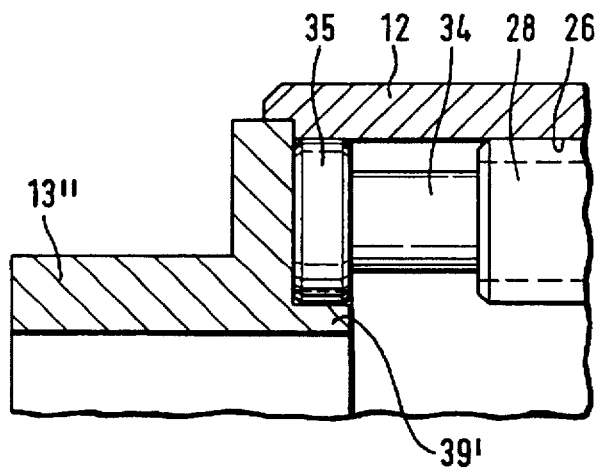
Figure 8B:
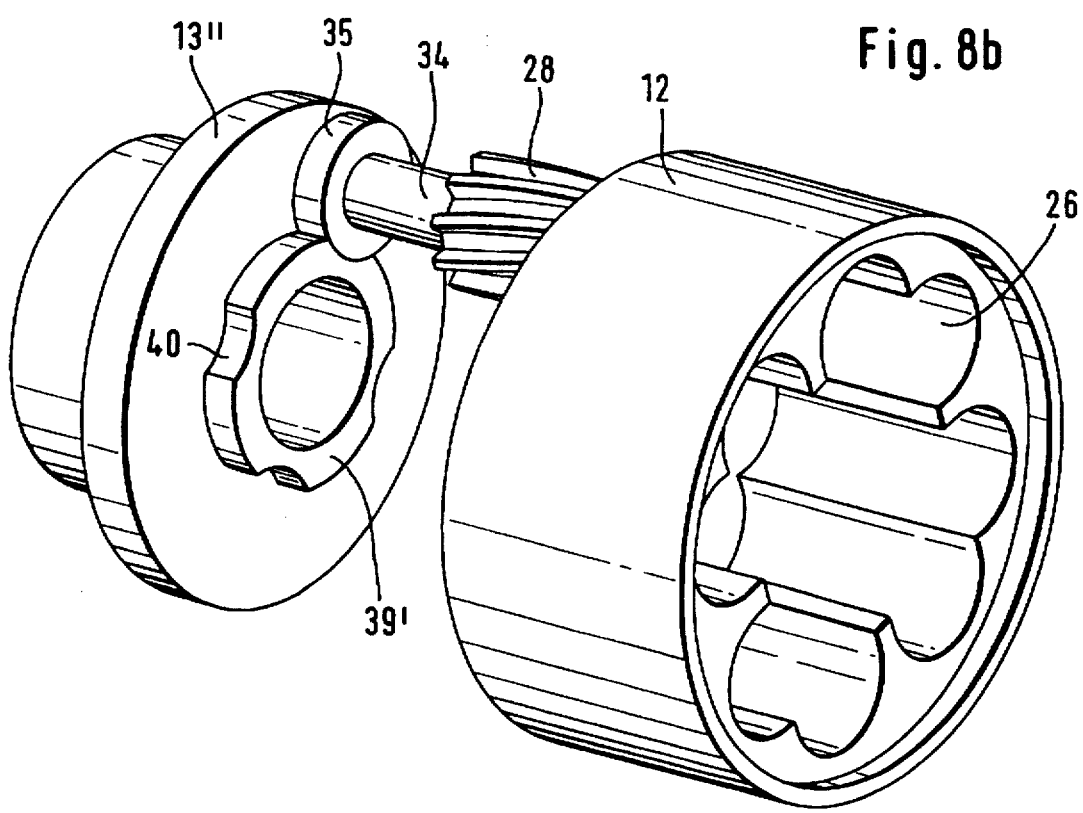

FIG. 8 shows the general configuration of the carrier portion, cover part and supporting rollers with additional supporting means for the supporting rollers in a third embodiment;

(a) in a partial longitudinal section (b) in a perspective illustration in the form of an exploded view.

Figure 9A:
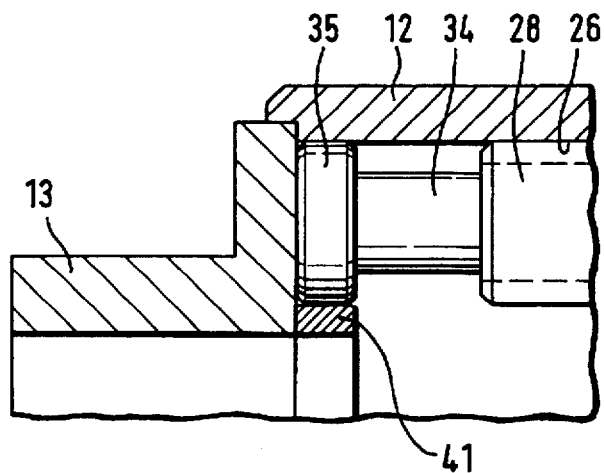
Figure 9B:
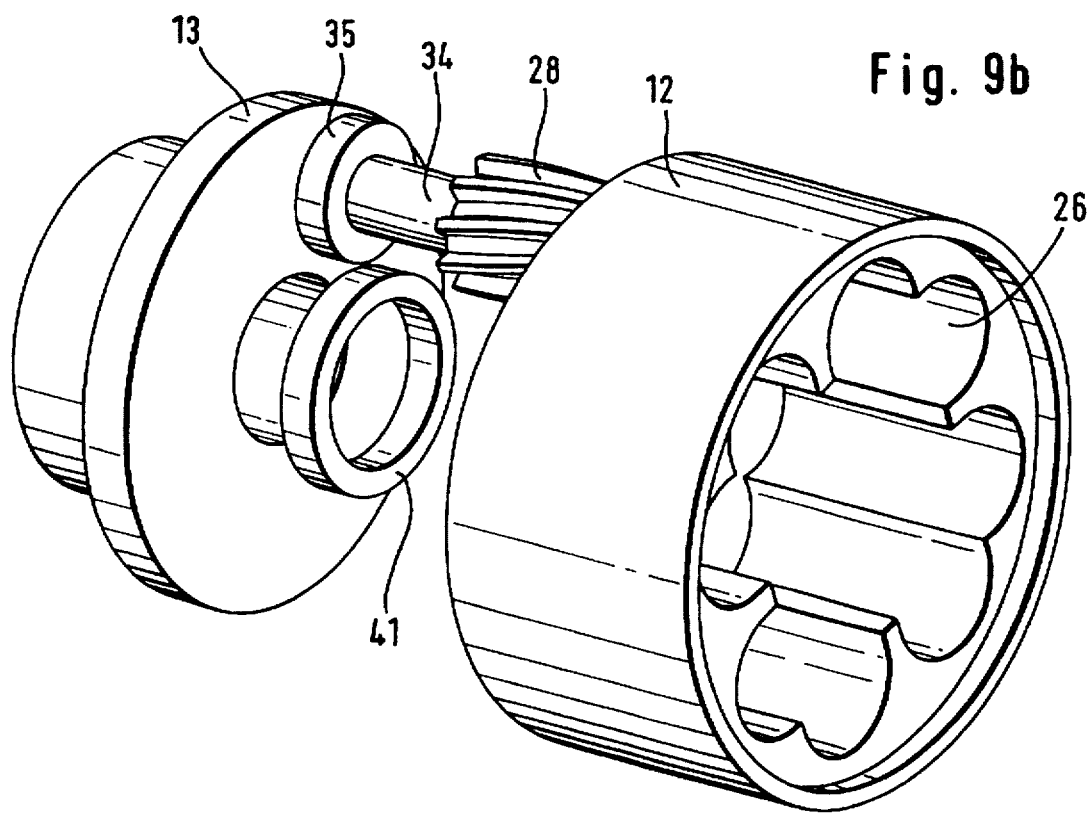

FIG. 9 shows the general configuration of the carrier portion, cover part and supporting rollers with additional supporting means for the supporting rollers in a fourth embodiment;

(a) in a partial longitudinal section (b) in a perspective illustration in the form of an exploded view.

Figure 10A:
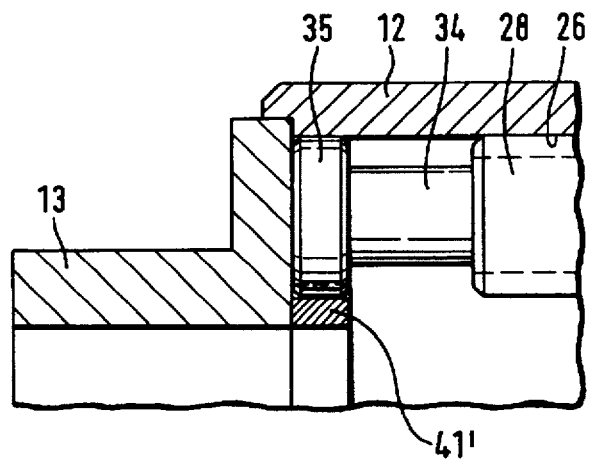
Figure 10B:
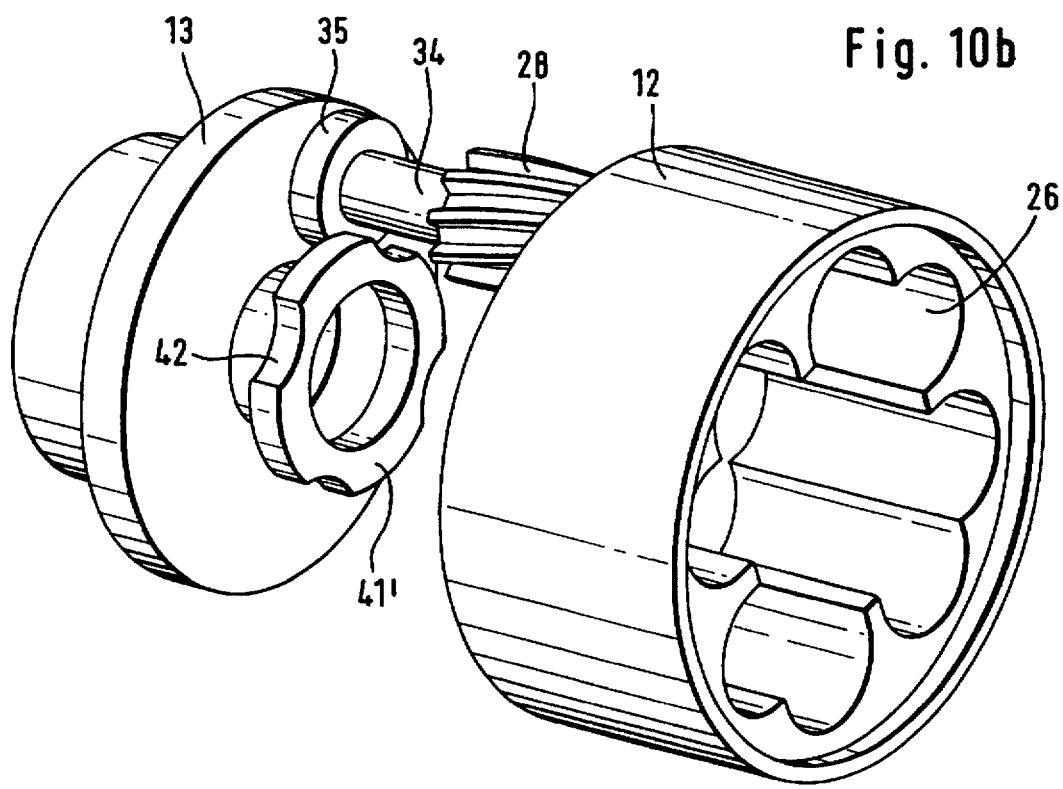

FIG. 10 shows the general configuration of the carrier portion, cover part and supporting rollers with additional supporting means for the supporting rollers in a fifth embodiment;

(a) in a partial longitudinal section (b) in a perspective illustration in the form of an exploded view.

Figure 11A:
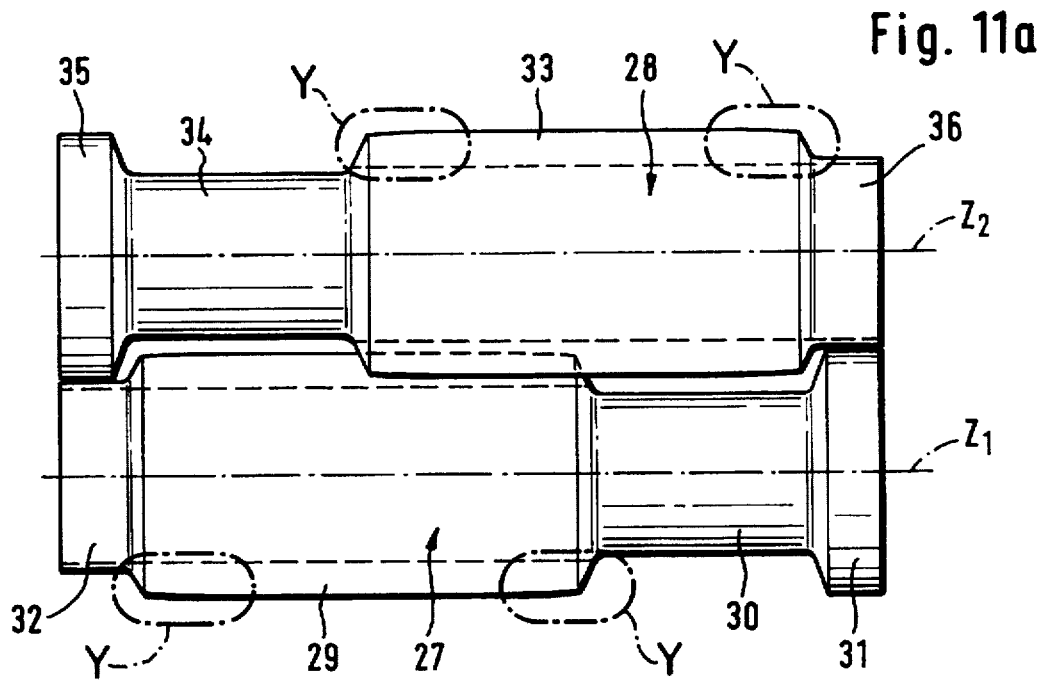

FIG. 11a in the form of a detail, shows a pair of differential gears whose teeth engage one another, with a curved shape of toothing, similar to FIG. 1.

Figure 11B:
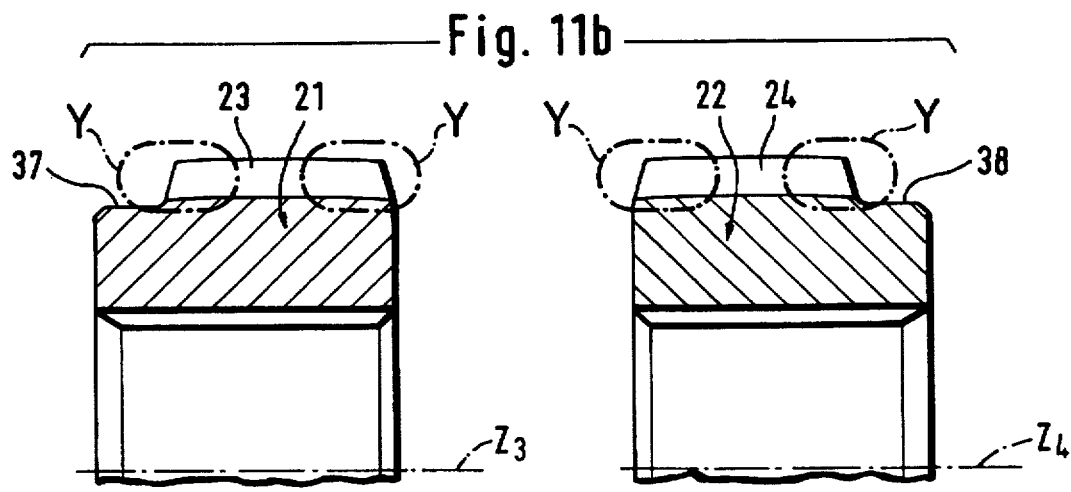

FIG. 11b in the form of a detail, shows the spaced axle shaft gears with a curved shape of toothing, similar to FIG. 1a.

Figure 11C:
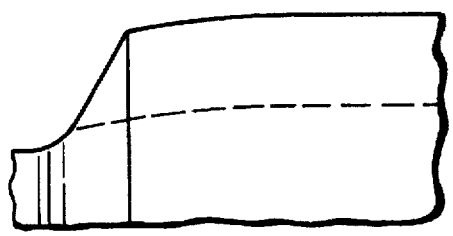

FIG. 11c shows the detail "Y" as illustrated in FIGS. 11a and 11b in an enlarged form.

DETAILED DESCRIPTION OF THE PREFERRED EMBODIMENT(S)

FIGS. 1a and 1b show a differential carrier 11 which consists of a carrier portion or central portion 12 with a substantially axially constant cross-section and two final cover parts 13, 14 axially adjoining same. The parts of the differential carrier 11 are axially clamped together by bolts (not illustrated). At the carrier portion 12 there is identifiable an end flange 15 for fixing a crown wheel by means of which the differential carrier may be rotatingly driven via a pinion which has to be supported in the drive housing (not illustrated). It would also be possible to introduce the torque through one of the cover parts 13, 14. The cover parts 13, 14 each comprise coaxial sleeve projections 17, 18 for slipping on bearing means. Such bearings may be used for rotatably supporting the differential carrier in the drive housing (not illustrated). The sleeve projections 17, 18 form through-apertures 19, 20 which are suitable for passing through axle shafts. Axle shaft gears 21, 22 and a central spacing piece 43 are arranged in a coaxially continuous bore 44 in the carrier portion. Instead of the separate spacing piece 43 it is also possible to use correspondingly long spacing projections at both axle shaft gears 21, 22 or at one of same. The T axle shaft gears 21, 22 comprise toothed regions 23, 24 which are followed by outwardly projecting central cylindrical projections 37, 38. The axle shaft gears 21, 22 rest axially centrally against the central spacing piece 43 and are each supported on the outside by the planar cover parts 13, 14. The bore 44 forms penetration regions with axis-parallel pairs of recesses 25, 26 accommodating differential gears 27, 28. One of four differential gears 27 of a first set can be seen in a longitudinal section in its recess 25. One of four differential gears 28 of a second set can be seen in a longitudinal section in its recess 26. Different numbers of differential gears can also be used for each set.

Figure 2:
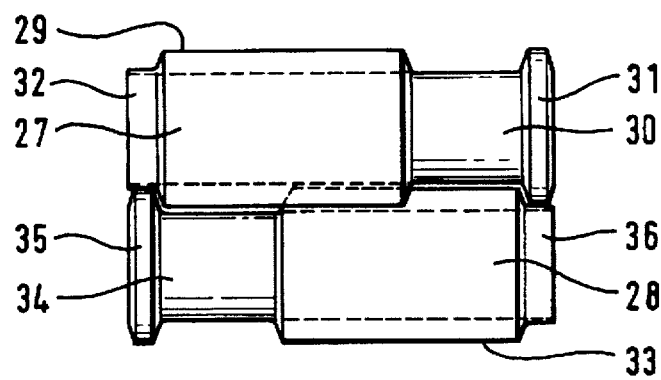
FIG. 2 in the form of a detail, shows a pair of differential gears whose teeth engage one another.

FIG. 2 shows how two differential gears 27, 28 of the two sets are associated with, and engage, one another. The differential gears 27, 28 each comprise toothed portions 29, and first spacing journals 30, 34 which, at their ends, form supporting discs 31, 35 which are guided and radially inwardly supported in the recesses 25, 26. Second spacing journals 32, 36 of the length of the cylindrical projections 37, 38 extend in opposite directions to the first spacing journals 30, 34 and adjoin the toothed regions 29, 33.

In the present embodiment, the second spacing journals 32, 36 and the cylindrical projections 37, 38 create a free space for the supporting discs 31, 35 supported in the recesses 25, 26.

The direct support (see FIG. 2) between the supporting disc 31, 35 of the one differential gear and the second spacing journal 36, 32 of the other differential gear, which support substantially acts in the circumferential direction in the differential carrier, can be achieved. However, the diameter of the second spacing journal may be reduced to such an extent that mutual support does not take place. The diameter of the supporting discs 31, 35 is defined by the major diameter of the toothed regions 29, 33. The diameter of the first spacing journals 30, 34 is such that the first spacing journals 30, 34 remain contact-free relative to the toothed regions 33, 29 of the respective other differential gear and the toothed regions 24, 23 of the respective other axle shaft gear 22, 21.

Figure 3:
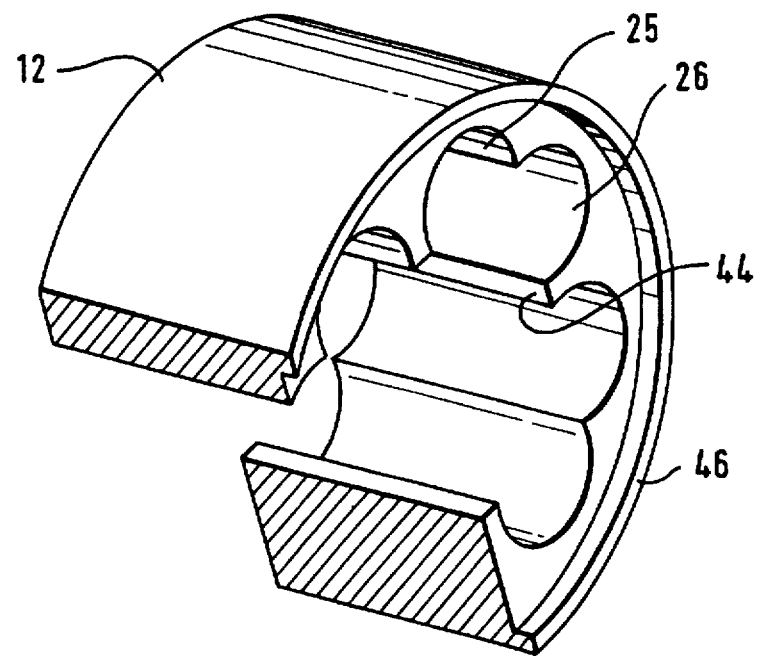
FIG. 3 shows a perspective view of a section through a carrier portion of a differential drive in accordance with the invention.

FIG. 3, in a perspective view, clearly shows how the coaxial inner bore 44 and the pairs of recesses 25, 25 intersect one another. Because of the mutual penetration, the inner bore 44 is reduced to small residual portions. As a rule, the axle shaft gears are freely centered in the differential carrier by means of the teeth of the differential gears 27, 28 which engage one another. At the outer edge of the carrier portion 12 there can be seen a projecting centering collar 46 into which it is possible to insert a cover part delimited by a cylindrical centering edge 47.

Figure 4:
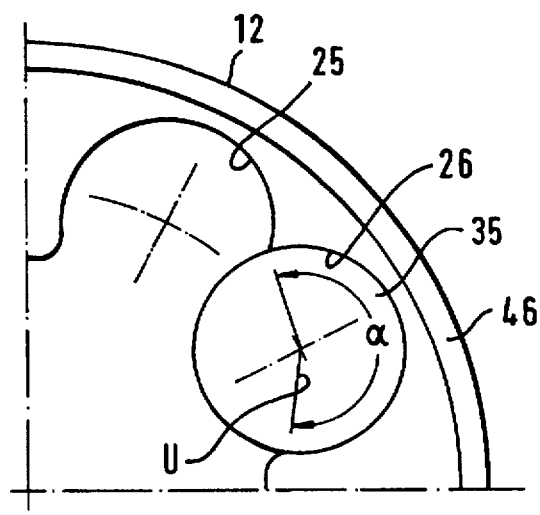
FIG. 4 is part of a section through a carrier portion according to FIG. 3, with the section extending perpendicularly relative to the axis of the contact or grip angle U as shown.

FIG. 4 shows how one of the supporting discs is supported inside its recess 26 in the carrier portion 12, and because of the contact or grip angle U, with α being greater than 180°, any radially inwardly directed force components can be accommodated.

Figure 5A:
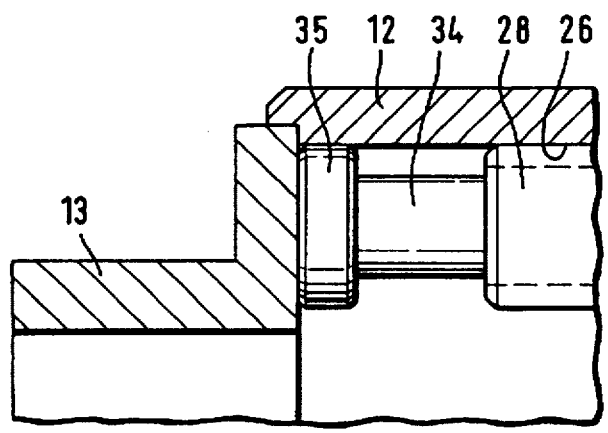
FIG. 5 shows the general configuration of the carrier portion, cover part and supporting roller in an embodiment not comprising additional supporting means for the supporting rollers.
Figure 5B:
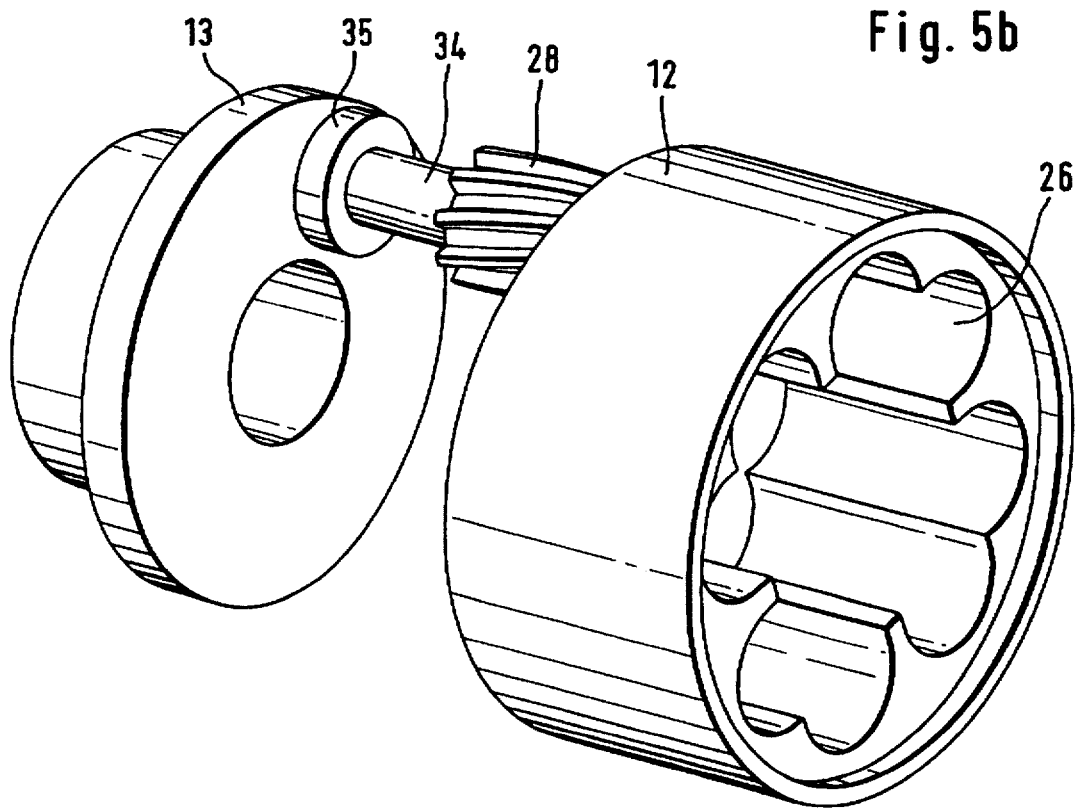

FIG. 5, in a longitudinal section and perspective exploded view, shows the carrier portion 12, the cover part 13 and a differential gear 28 as details. At the differential gear 28, the first spacing journal 34 and the supporting disc 35 are identifiable. The arrangement corresponds to that shown in FIG. 1. The respective axle shaft gear is not illustrated in order to symbolize that in this embodiment, the supporting disc 35 of the differential gear 28, is supported only in its recess 26 radially inwardly. The inner face of the cover part 13 is completely planar.

FIG. 6, again, shows the carrier portion 12, a cover part 13 and a differential gear 28 as well as the locally associated axle gear shaft 21. At the differential gear 28, the first spacing journal 34 and the supporting disc 35 are identifiable. The method of illustration corresponds to that of FIG. 5. FIG. 6 differs from FIG. 1 in that the cylindrical projection 37 at the axle shaft gear 21 is dimensioned in such a way that additional radial support for the supporting disc 35 is achieved by means of line contact with the cylindrical projection 37.

FIG. 7, as details, shows the carrier portion 12, a cover part 13' and a differential gear 28. At the differential gear 28, a first spacing journal 34 and the supporting disc 35 are identifiable. The method of illustration corresponds to that of FIG. 5. At the cover part 13', there is provided an inwardly directed cylindrical projection 39 which additionally radially inwardly supports the supporting disc 35 by means of line contact. The axle shaft gear not illustrated in this case must be assumed to have been shortened by the cylindrical projection 37 shown in FIG. 6. The axially supporting contact between the cover part and the axle shaft gear is provided by the cylindrical projection 39.

FIG. 8 illustrates the carrier portion 12, a cover part 13" and a differential gear as details in the same way as FIG. 7. A cylindrical projection 39' arranged at the cover part 13" is enlarged relative to the cylindrical projection 39 and comprises circumferentially distributed cylindrical pockets 40 which are form-fittingly engaged by the supporting disc 35 for the purpose of achieving surface support.

FIG. 9 illustrates a carrier portion 12, a cover part 13 and a differential gear 28 as details in the same way as FIG. 5. At the differential gear 28, a first spacing journal 34 and the supporting disc 35 are identifiable. As in the embodiments according to FIGS. 5 and 6, the inside of the cover 13 is completely planar. In this embodiment, the cylindrical projection shown in FIG. 8 is replaced by a separate annular member 41 on which the supporting disc 35 is supported radially inwardly. The annular member 41 is held radially floatingly between the circumferentially distributed supporting discs of the axle shaft gears 28. As explained in connection with FIG. 7, the associated axle shaft gear which is not shown in this embodiment must be assumed not to comprise its own cylindrical projection, i.e. to be shortened relative to the embodiment according to FIG. 6.

FIG. 10 shows a carrier portion 12, a cover part 13 and a differential gear 28 as details. Similarly to the illustration to FIG. 9, there is provided a separate annular member 41' which is enlarged relative to the annular member 41 and, on its circumferences, comprises pockets 42 which are engaged by the supporting discs 35 of the differential gears 28 for the purpose of achieving surface contact. The annular member 41' is arranged so as to be radially floating and is prevented from rotating by the form-fitting engagement of the supporting discs 35, which is not the case with the annular member 41 according to FIG. 9. The contents of what is said in connection with FIG. 9 in respect of the associated axle shaft gear also applies in this case, i.e. the latter does not comprise a cylindrical projection.

FIG. 11a shows a pair of differential gears 27, 28 which are associated with one another as shown in FIG. 2. Identical details have been given the same reference numbers; reference is therefore made to the description of FIG. 2. At the axial ends of the toothed regions 29, 33—in accordance with the repeated detail "Y"—the toothed regions are curved relative to the respective rotational axes $Z_1$, $Z_2$ in order to avoid any edge load bearing relative to the counter teeth of the axle shaft gears if the differential gears 27, 28 are subject to resilient bending under torque load.

In FIG. 11b, the two axle shaft gears 21, 22 are illustrated in the same way as in FIG. 1a in the form of half a section. Identical details have been given the same reference numbers; reference is therefore made to the description of FIG. 1a. At the axial ends of the toothed regions 23, 24—in accordance with the repeated detail "Y"—the toothed regions are curved relative to the respective rotational axes $Z_3$, $Z_4$ in order to achieve the effect described in connection with FIG. 11a above. If this shape of toothing is used both at the differential gears and at the axle shaft gears, the curvature may be less sharp.

FIG. 11c shows an enlarged detail "Y" which shows that the tooth height and thus, substantially, also the tooth shape remain unchanged in the curved region.

What is claimed is:

1. A differential drive with a differential carrier rotatably drivably supported in a differential housing, consisting of:

a carrier portion and two cover parts closing same at both ends, with two axle shaft gears which are coaxially rotatably supported in the differential carrier, which are received in coaxial bores in the carrier portion and are each connectable to an axle shaft, and with two sets of differential gears, which on their tooth heads, are slidingly received in axis-parallel recesses in the carrier portion which recesses intersect each other and the bores, with the teeth of the differential gears of each of the two sets engaging the teeth of one of the axle shaft gears and of at least one differential gear of the other set;

the axis-parallel recesses being designed to be axially continuous in the carrier portion and with the differential gears comprising toothed regions and spacing journals adjoining the latter, with the differential gears being axially supported on the cover parts by means of the spacing journals;

wherein the differential gears at one end of the toothed regions comprise spacing journals whose ends are provided with supporting discs whose greatest diameter corresponds to a major diameter of the toothed regions and that the differential gears at the other end of the toothed regions, comprise second spacing journals whose length approximately corresponds to that of the supporting discs with the supporting discs being slidingly supported inside the recesses in the carrier portion.

2. A differential drive according to claim 1, wherein the supporting discs and the second spacing journals of differential gears directly engaging one another are positioned in a contact-free way relative to one another.

3. A differential drive according to claim 1, wherein at least at one of said cover ends of the axle shaft gears comprise untoothed cylindrical projection extending axially towards the cover parts and cover part faces pointing towards the carrier portion are planar.

4. A differential drive according to claim 3, wherein the supporting discs are additionally radially inwardly supported on said cylindrical projections.

5. A differential drive according to claim 1, wherein at least at one of said cover ends of the cover parts comprise central projecting cylindrical collar which extends axially towards the carrier portion, which extend into the bores and on which the supporting discs are additionally supported radially inwardly.

6. A differential drive according to claim 5, wherein the circumference of the cylindrical collars is provided with inner cylindrical troughs which are radially inwardly supportingly engaged by the supporting discs.

7. A differential drive according to claim 1, wherein at least at one of one said cover ends, a separate central cylindrical annular members is inserted between the cover parts and the carrier portion which annular members extends into the bore, and the supporting discs are additionally radially inwardly supported on the annular member.

8. A differential drive according to claim 7, wherein the circumference of the annular members is provided with inner cylindrical troughs which are radially inwardly supportingly engaged by the supporting discs.

9. A differential drive according to claim 1, wherein the carrier portion comprises substantially planar end faces and the cover parts, at least outside a diameter defined by the bores, comprise planar inner faces which rest against end faces of the carrier portion.

10. A differential drive according to claim 9, wherein the carrier portion and the cover parts comprise centering means which are provided at a circumference and cooperate with one another.

11. A differential drive according to claim 1, wherein the supporting discs each comprise a smooth cylindrical surface.

12. A differential drive according to claim 1, wherein the supporting discs comprise teeth or a toothed run-out region of the same type as the toothed regions.

13. A differential drive according to claim 1, wherein the toothed regions of the differential gears, at least at one of the axial ends, each comprise a curved region which approaches rotational axis $Z_1$, $Z_2$.

14. A differential drive according to claim 1, wherein the toothed regions of the axle shaft gears at least at their ends pointing towards the respective other one of the axle shaft gears each comprise a curved region which approaches rotational axis $Z_3$, $Z_4$.

* * * * *

UNITED STATES PATENT AND TRADEMARK OFFICE
CERTIFICATE OF CORRECTION

PATENT NO. : 5,785,624
DATED : July 28, 1998
INVENTOR(S) : Nikolaus Mayr

It is certified that error appears in the above-identified patent and that said Letters Patent is hereby corrected as shown below:

Abstract; Line 1 after "A" delete "different" replace with --differential--.

Col. 5, Line 62, after "The" delete --T--.

Col. 8, Line 65, Claim 7 after "of" delete --one--.

Col. 8, Line 66, Claim 7 after "annular" delete "members" replace with --member--.

Col. 9, Line 1, delete "members" insert --member--.

Signed and Sealed this

Sixteenth Day of February, 1999

Attest:

Attesting Officer

*Acting Commissioner of Patents and Trademarks*